United States Patent Office 3,190,825
Patented June 22, 1965

3,190,825
BROMINATION OF AROMATIC COMPOUNDS
Earl S. Huyser, Lawrence, Kans., assignor to The Dow Chemical Company, Midland, Mich., a corporation of Delaware
No Drawing. Filed July 19, 1961, Ser. No. 125,091
7 Claims. (Cl. 204—163)

This application is a continuation-in-part of my copending application Serial No. 828,041, filed July 20, 1959, now abandoned.

This invention relates to a novel method of effecting an exchange between the bromine in a brominating agent and the labile replaceable benzylic hydrogen substituent of certain mono-nuclear aromatic compound. In the past, no easy and simple method of substituting a bromine atom for a specific benzylic hydrogen has existed.

The bromination of substituents of mono-aromatic compounds such as ethyl toluene, methoxy toluene and the like by conventional methods in general results in a variety of products. Among the reaction products may be found monobromo- and frequently polybromo-derivatives and isomers thereof. Generally, only one of such reaction products is desired and usually must be separated from the reaction mixture by time-consuming and arduous methods. In cases wherein the desired product contains one bromine atom per side chain group in the $\alpha$ position, frequently bromination will proceed beyond the desired degree and give an $\alpha,\alpha$-dibromo substitution on the side chain group. Alternately, if two or more bromine atoms are to be introduced into the $\alpha$ and $\alpha'$ positions in an aromatic compound having two side chains and at least three benzylic hydrogens not on the same side chain, generally much difficulty is encountered in separating from the reaction mixture $\alpha,\alpha'$-dibromo compounds and the corresponding $\alpha,\alpha$-dibromo isomer. Side reactions having reaction rates in the same order of magnitude as the reaction rate of the desired product usually sharply reduce the yield and consequently undesirably complicate the recovery of the desired product.

Conventional bromination techniques when applied to polyalkyl mono-aromatic position isomers usually have generally similar bromination rates for each isomer. Unless the isomers are separated before bromination, it is frequently equally difficult to isolate the desired products from the reaction mixture, particularly when generally similar quantities or isometric compounds are produced.

It would be advantageous to have available a method for selectively brominating benzylic hydrogen.

It would be most advantageous if a method were available which would allow the mono-bromination of such benzylic hydrogens.

It would be extremely advantageous if such a method were available which would allow benzylic bromination to proceed without also producing an appreciable quantity of undesired brominated by-products.

It would also be advantageous if a method were available which would provide a significant difference in the bromination rate of one of two isomers.

It would be further advantageous if such a method were simple and would not require complex equipment, either for the reaction or the recovery of the desired product.

These and other beneficial results may be obtained by employing a method for the selective replacement of benzylic hydrogens by bromine atoms in a compound having the general formula:

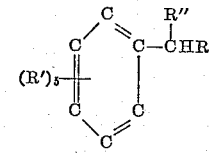

wherein R is selected from the group consisting of hydrogen, and alkyl radicals containing up to 4 carbon atoms having not over 3 carbon atoms attached to any carbon atom, and R' is a radical individually selected from the group consisting of hydrogen, alkyl radicals containing up to 4 carbon atoms, alkyl ethers, fluorine, chlorine, bromine, ester radicals containing from 2 to 4 carbon atoms in such radical, R" is selected from the group consisting of hydrogen and methyl radicals, with the further limitation that when all R's are hydrogen, R" is methyl, which method comprises contacting said compound with a brominating agent selected from the group consisting of bromotrichloromethane, carbon tetrabromide, dibromodichloromethane, 1-bromo-1,1-dichloroethane and their mixtures, and maintaining the reaction mixture at a temperature between about 0° and about 130° C. and advantageously between about 30° and about 90° C., in the presence of a free radical initiating catalyst until at least a portion of the reactants have reacted.

Suitable starting materials for the bromination are oftentimes readily available as conventional technical grade products, such as ethylbenzene, xylene, methyl p-toluate and the like. If a particularly pure product is to be recovered from a reaction in accordance with the invention, it is generally advantageous to use starting materials of a suitable purity. Frequently, it may be found advantageous to remove dissolved or occluded water and solid contaminants by a flash distillation or filtering through a dehydrating agent such as calcium chloride, anhydrous sodium sulphate and the like.

The reaction may be carried out in the presence of solvents or diluents such as chlorobenzene, carbon tetrachloride, methylene chloride, and similar solvents or diluents which are substantially non-reactive with the reactants or the reaction products under the conditions of the reaction. It may be advantageous to employ such a diluent if reactions are carried to high conversions and the reaction product tends to precipitate or crystallize from solution.

Suitably, an autogenous pressure may be employed while carrying out the reaction according to the invention. However, pressures higher or lower may be employed without appreciably affecting the reaction. It may be advantageous to superimpose a higher pressure of an inert gas over the reaction mixture.

Free radical initiating catalysts which are effective in the process include azo catalysts, such as azobisisobutyronitrile, organic peroxides including acyl and aliphatic peroxides such as acetyl peroxide and benzoyl peroxide, alkyl peroxides such as di-tert.-butyl peroxide, and irradiation under the influence of high energy fields which may include various actinic rediations such as ultraviolet light and X-rays, or high energy radiations such as accelerated electrons and gamma radiation as well as radiation from radioactive materials.

The organic peroxide free radical initiating catalyst may be selected from a wide variety including dibenzoyl peroxide, di-tert.-butyl peroxide, dicumyl peroxide, lauryl peroxide, peracetic acid, and the like. Similarly, many of the conventional azo catalysts are operable and beneficially, the organic free radical initiating catalyst should be chosen to have a half life of about 5–10 hours within the operating temperature which is to be employed during the reaction. Excessively rapid decomposition of the catalyst oftentimes will cause an undesired temperature rise if a too rapid reaction occurs. Usually, it is advantageous to employ from about 0.001 to about 0.1 mole of free radical initiating catalyst per mole of brominating agent. For most operations, beneficially from about 0.01 to 0.05 mole of the radical initiating catalyst are employed per mole of brominating agent.

Advantageously, the reaction may be catalyzed by any conventional source of ultraviolet radiation capable of providing electro-magnetic radiation having wave lengths in the range from about 4000 angstroms to about 1200 angstroms. Suitable radiation may be readily obtained from such sources as sunlight, mercury vapor discharge lamps, fluorescent lamps, carbon arcs and the like.

Conventional sources of high energy radiation are readily employed for the practice of the invention. X-ray generators, radioactive isotopes, electron accelerators, and the like which produce gamma radiation, X-ray energy or high energy electrons generate free radicals and permit bromination in accordance with the invention. Generally, dosage levels 0.01 to 10 megarads are employed. Beneficially, total dosages of 0.2 to about 1 megarad are often adequate for most purposes. The dosage rate usually employed will vary from about 40,000 rads per hour to about 10 megarads per hour, and beneficially between about 100,000 rads per hour to about 1 megarad per hour.

It is frequently desirable to provide an excess of the compound to be brominated with respect to the brominating agent. For example, if it were desired to prepare an α-bromoxylene, a ratio of approximately about 1 mole of the brominating agent to about 4 to 8 moles of the xylene would be employed with advantage in the reaction, in order to suppress the formation of the dibromo compound.

It is oftentimes advantageous to supply the brominating agent in stoichiometric molar excess of from about 3 to 10 percent based on the alkyl aromatic compound employed. If, for example, an α,α'-dibromoxylene were being prepared, about 2 moles of the brominating agent would be provided to 1 mole of the xylene. By employing up to a 1:10 molar ratio of the brominating agent to the compound being brominated, the bromine acceptor may also function as a solvent. A second bromine atom may be introduced in the molecule if substantially stoichiometric equivalents are employed. Thus, for example, either an α-monobromoxylene or an α,α'-dibromoxylene may be obtained from the reaction mixture if a suitable ratio of reactants is employed.

In general, the reaction is readily carried out by mixing the brominating agent and the compound to be brominated together with the catalyst if azo compounds or peroxides or the reactants are placed in a vessel having a provision for the transmission into the vessel of the suitable free radical initiating catalyst.

Advantageously, the reaction vessel may be provided with an agitator and a suitable jacket or other heat exchange means to maintain the reaction at the desired temperature. Alternately, bromination in accordance with the invention may be accomplished in a continuous manner by employing conventional illuminated continuous reactors. When the reaction is complete, the desired end product may readily be separated by simple crystallization, fractional distillation, or similar conventional means.

The invention is further illustrated, but not restricted, by the following examples.

*Example I.—Bromoethylbenzene*

A 500 milliliter round bottom boro-silicate glass flask was fitted with an 18 inch spiral reflux condenser and thermometer. A mixture of .53 (0.50 mole) of ethylbenzene and 99 g. (0.50 mole) of bromotrichloromethane was added. A General Electric 275 watt sunlamp was placed 6 inches from the bottom of the flask. The temperature of the reaction flask and contents were maintained in the range from about 55° C. to about 65° C. by means of an air stream directed at the bottom of the flask. Illumination with the sunlamp was continued for a period of about 6 hours. The contents of the flask were then fractionally distilled. The reaction mixture was distilled and the fraction boiling from 50° C. at 745 milliliters of mercury absolute pressure to 80° C. at 50 milliliters absolute pressure was removed and analyzed by vapor phase chromatography. The analytical results were: 43 g. (0.36 mole) of chloroform, 20 g. (0.10 mole) of bromotrichloromethane, and 14 g. (0.13 mole) of ethyl benzene. Distillation of the residue at about 77° C. under an absolute pressure of 12 milliliters of mercury yielded 67 grams (0.36 mole) of α-bromoethylbenzene. The infrared spectrum of the α-bromoethylbenzene prepared in this manner was identical with that of a standard sample of α-bromoethylbenzene prepared by another synthetic route.

*Example II.—p-Chlorobenzyl bromide*

By employing a procedure similar to Example I, 63.3 g. (0.50 mole) of p-chlorotoluene and 99 g. (0.50 mole) of bromotrichloromethane were illuminated for 6 hours. The reaction mixture was distilled and the vapor phase chromatographic analysis of the material boiling from about 50° C. at 748 milliliters of mercury absolute pressure to 80° C. at 45 milliliters of mercury absolute pressure indicated the following composition: chloroform 36 g. (0.30 mole); bromotrichloromethane 36 g. (0.18 mole); p-chlorotoluene 27 g. (0.21 mole). The residue from this distillation was 58 g. (0.29 mole) of p-chlorobenzyl bromide. The residual material solidified on cooling and was recrystallized from ethyl alcohol. The recrystallized p-chlorobenzyl bromide melted from about 49.5° to about 50.5° C.

*Example III.—p-Bromobenzyl bromide*

A mixture of 63 g. (0.33 mole) of p-bromotoluene and 99 g. (0.50 mole) of bromotrichloromethane was illuminated for 7 hours at about 55° C. in the apparatus employed in Example I to 65° C. Vapor phase chromatographic analysis of the material boiling up to 75° to 80° C. at about 25 milliliters absolute pressure indicated: chloroform 16.5 g. (0.14 mole); bromotrichloromethane 71 g. (0.36 mole) and p-bromotoluene 33.5 g. (0.19 mole) and p-bromobenzyl bromide 34 g. (0.14 mole) which was recrystallized from ethyl alcohol and melted over the range from about 60.5° to about 61° C.

*Example IV.—Methyl α-bromo-p-toluate*

A mixture of 75 g. (0.50 mole) of methyl p-toluate and 99 g. (0.50 mole) of bromotrichloromethane was illuminated for 6 hours at about 55° C. to 65° C. utilizing the equipment of Example I. The material boiling from 50 to 105° C. at atmospheric pressure was analyzed by vapor chromatography with the following result: chloroform 11.9 (0.10 mole); bromotrichloromethane 77.2 g. (0.39 mole). Further distillation yielded 57 g. (0.38 mole) of unreacted methyl p-toluate. The residue from this distillation was 21 g. (0.09 mole) of methyl α-bromo-p-toluate which solidified on cooling. The residue was recrystallized from ethyl alcohol and melted over the range of from 55° to 56° C.

*Example V.—α-Bromo-p-xylene*

Irradiation of a mixture of 53 g. (0.50 mole) of p-xylene and 99 g. (0.50 mole) of bromotrichloromethane for 4 hours at about 60° C. by means of a General Electric 275 watt sunlamp placed 6 inches below a 500 milliliter flask containing the reaction mixture, gave a fraction boiling from 50° C. to 55° C. at an absolute pressure of 50 milliliters of mercury. This fraction was analyzed by vapor phase chromatography with the following result: chloroform 31.2 g. (0.27 mole); bromotrichloromethane 35.7 g. (0.18 mole); p-xylene 22.2 g. (0.21 mole). On distillation of the residue at from about 60° to 65° C. under an absolute pressure of 7 milliliters of mercury 44 g. (0.24 mole) of α-bromo-p-xylene was obtained which solidified on cooling. The α-bromo-p-xylene obtained from the reaction melted at 35° C. A high boiling residue remained which was found to be 8.7 g. (0.03 mole) of crude α,α'-dibromo-p-xylene. This residue was recrystallized from chlorobenzene and melted at about 143° C. Infra-red analysis of the crude residue showed only trace amount of α,α-dibromo-p-xylene.

Example VI.—Dibromo-p-xylene

Adhering to the experimental procedure of Example I, a mixture of 55.5 g. (0.30 mole) of α-bromo-p-xylene and 59.4 g. (0.30 mole) of bromotrichloromethane was irradiated. The reaction mixture was heated under reduced pressure and the lower boiling materials collected and were analyzed by vapor phase chromatography. The analytical results were: chloroform 10.5 g. (0.09 mole); bromotrichloromethane 36 g. (0.18 mole). Distillation of the residue at a temperature between 65° and 75° C. under an absolute pressure of 8 milliliters yielded 35 g. (0.19 mole) of unreacted α-bromo-p-xylene. On cooling of the reaction mixture, 27.5 g. (0.10 mole) dibromo-p-xylene solid was obtained. This residue was recrystallized from chlorobenzene to yield α,α'-dibromo-p-xylene which melted at about 144° C. Infra-red analysis of the crude dibromo-p-xylene showed only trace amounts of α,α-dibromo-p-xylene.

Example VII.—p-Methoxybenzyl bromide

A procedure similar to Example I was employed wherein 31 g. (0.25 mole) of p-methylanisole and 49.5 g. (0.25 mole) of bromotrichloromethane were illuminated for a period of 3 hours. The reaction mixture was distilled and the vapor phase chromatographic analysis of the material boiling from about 50° C. at 760 millimeters of mercury absolute pressure to about 100° C. at 8 milliliters absolute pressure indicated the following composition: chloroform (0.07 mole); bromotrichloromethane (0.17 mole); p-methylanisole (0.17 mole). The total weight of the fraction was 63 grams. The residue from the distillation was 11.5 grams of p-methoxybenzylbromide which distilled over the range 105° to 110° C. at 8 millimeters of mercury absolute pressure. The thiouronium picrate of this material melted over the range 164° to 165° C.

Example VIII

A reaction mixture consisting of 150 grams (0.75 mole) of bromotrichloromethane, 51 grams (0.33 mole) of p-ethylbenzyl chloride and 25 grams (0.165 mole) of o-ethylbenzyl chloride, was illuminated in a manner similar to the preceding example at a temperature of about 75° C. The reaction mixture was distilled to yield the following quantities of starting materials: 21.4 grams (0.138 mole) of ethylbenzyl chloride and 20.4 grams (0.132 mole) of o-ethylbenzyl chloride. The relative reactivity of the ortho and para isomers was determined by employing the following formula:

$$R = K_p/K_o = \frac{\log(C_{p'}) - \log(C_{p_2})}{\log(C_{o'}) - \log(C_{o_2})}$$

wherein R is the relative reactivity of the para isomer to the ortho isomer, $K_p$ is the rate constant for bromination of para isomer, $K_o$ is the rate constant for bromination of ortho isomer, $C_{p'}$ is the initial molar concentration of the para isomer in the reaction mixture, $C_{p_2}$ is the final molar concentration of the para isomer in the reaction mixture $C_{o'}$ is the initial molar concentration of the ortho isomer in the reaction mixture and $C_{o_2}$ is the final molar concentration of the ortho isomer in the reaction mixture. A reactivity ratio of 3.69:1 for para to ortho isomer was calculated employing the above formula. Such a significant difference in the difference in the reaction rates provide a convenient method for obtaining the desired isomer.

Example IX

In a 500 milliliter Florence flask was placed a mixture of 1 gram mole of ethylbenzene, 0.2 of a gram mole of bromotrichloromethane and 0.012 gram mole of benzoyl peroxide. The reaction mixture was agitated and maintained at a temperature of about 78° to 80° C. for a period of 72 hours. The reaction mixture was fractionally distilled and 0.11 gram mole of chloroform and 0.10 gram mole of 1-bromoethylbenzene were obtained as products. Examination of the reaction products by infra-red analysis indicated that no detectable amount of 2-bromoethylbenzene was present.

Example X

In a 500 milliliter Florence flask was placed a mixture of 1 gram mole of ethyl benzene, 0.2 of a gram mole of bromotrichloromethane, and 0.012 gram mole of azobisisobutronitrile. The reaction mixture was agitated and maintained at a temperature of about 78° to 80° C. for a period of 72 hours. The reaction mixture was fractionally distilled and 0.14 gram mole of chloroform and 0.13 gram mole of 1-bromoethylbenzene were obtained as products. Examination of the reaction products by infra-red analysis indicated that no detectable amount of 2-bromoethylbenzene was present.

Example XI

The reaction mixture consisting of 1 gram mole of ethyl benzene and 0.2 gram mole of bromotrichloromethane was placed in a 500 milliliter Erlenmeyer flask. The flask and contents were exposed to high energy radiation from a cobalt 60 source at a temperature of about 80° to 90° C. for a period of about 6 hours. The reaction mixture absorbed a total dose of 0.4 megarad. Distillation of the reaction mixture yielded 0.12 gram mole of chloroform and 0.13 gram mole of bromoethylbenzene. Examination of the reaction products under infra-red analysis indicated that no detectable amount of 2-bromoethylbenzene was present.

Example XII

A reaction mixture consisting of 10.5 g. (0.10 mole) ethylbenzene and 4 g. (0.02 mole) of bromotrichloromethane were sealed in a glass ampoule and placed adjacent to a gold target in a Van der Graaf generator. The gold target was bombarded with a 2 million volt electron beam having a current of 250 micro amperes. An X-ray radiation was emitted. The reaction mixture was removed after a total dosage of 0.4 megarad was observed. Partial separation of the product and infra-red analysis of the fractions indicated the presence of chloroform and 1-bromoethylbenzene in about equivalent amounts. No 2-bromoethylbenzene was detected.

Example XIII

In a manner similar to the foregoing example, a like reaction mixture was exposed to accelerated electrons generated on a Van der Graaf generator operating at a current of 250 microamperes at a potential of 2 million volts. Results similar to those in Example XII were obtained.

In a similar manner, other compounds having benzylic hydrogens are selectively brominated by the brominating agents of the invention to yield the corresponding brominated compounds having bromine in an α position. Typical examples of such compounds are: propyl benzene, butyl benzene, α-methyl propyl benzene, β-methyl propyl benzene, 1,2-diisopropyl benzene, 1,3-diisopropyl benzene, 1,4-diisopropyl benzene, 1,5-dibutyl benzene, 1,4-dibutyl benzene, 1-ethyl-3-tertiary-butyl benzene, 1-ethyl-3,4,5-tertiary-butyl benzene, hexamethyl benzene, 3-ethoxytoluene, mesitylene, pseudocumene, hemimellitene, 1,2,4-triethylbenzene, p-ethyl benzyl bromide, 1,3,5-triethylbenzene, durene, isodurene, prehnitene, m-tolyl bromide, o-butyltoluene, m-butyltoluene, p-butyltoluene, o-chlorotoluene, o-ethyltoluene, p-ethyltoluene, o-fluorotoluene, m-fluorotoluene, p-fluorotoluene, o-propyltoluene, m-propyltoluene, p-propyltoluene, o-ethyltoluate, m-ethyltoluate, 5-isopropyl-2-methyl acetophenone, o-cymene, m-cymene, p-cymene, 4-ethyl-o-xylene, o-xylene, m-xylene, 4-bromo-m-xylene, 4,6-dibromo-m-xylene, 4-ethyl-m-xylene, p-xylene, 2-bromo-p-xylene, 2-ethyl-p-xylene, m-chlorotoluene, o-chlorotoluene, p-chlorotoluene, 3,5-diethyltoluene, o-ethyltoluene, 2-butoxytoluene, 3-butoxytoluene, 4-butoxytoluene, 2-ethoxytoluene, 3-ethoxytoluene, 4-ethoxytoluene, 2-methoxytoluene, 3-methoxytoluene, 2-propoxytoluene, 3-propoxytoluene and 4-propoxytoluene.

By way of illustration, mesitylene is brominated according to the method of the invention employing dibromodichloro methane in the presence of ultra-violet light to yield α-bromomesitylene or α,α'-dibromomesitylene or α,α',α''-tribromomesitylene, the particular product obtained depending on the ratio of brominating agent to the compound being brominated. Compounds such as 4-butoxytoluene and 2-ethoxytoluene when brominated by the method of the invention yield 4-butoxy-α-bromotoluene and 2-ethoxy-α-bromotoluene respectively.

As is apparent, the method of the invention is acceptable of being embodied with various alterations and modifications from that which has been described in the preceding description and specification. For this reason, it must be fully understood that all of the foregoing is merely entered to be illustrative and is not construed or interpreted as being restrictive or otherwise limiting of the present invention except as set forth and defined in the appended claims.

What is claimed is:

1. A method for the selective replacement of benzylic hydrogens by bromine atoms in a compound having the general formula:

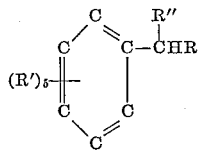

wherein R is selected from the group consisting of hydrogen, and alkyl radicals containing up to 4 carbon atoms and having not over three carbons attached to any carbon atom, and R' is a radical individually selected from the group consisting of hydrogen, alkyl radicals containing up to 4 carbon atoms, alkoxy, fluorine, chlorine, bromine, ester group containing radicals containing from 2 to 4 carbon atoms in such radicals, R'' is selected from the group consisting of hydrogen and methyl radicals, with the further limitation that when all R's are hydrogen R'' is methyl, which method comprises contacting said compound with a brominating agent selected from the group consisting of bromotridichloromethane, carbon tetrabromide, dibromodichloromethane, 1-bromo-1,1-dichloroethane and their mixtures and maintaining the reaction mixture at a temperature between about 0° C. and about 130° C., in the presence of a free radical initiating catalyst until at least a portion of the reactants have reacted.

2. The method of claim 1, wherein the free radical initiating catalyst is an organic peroxide.

3. The method of claim 1, wherein the reactants are diluted with a solvent which is substantially non-reactive with the reactant and the reaction products under the condition of the reaction.

4. The method of claim 1, wherein the temperature of the reaction mixture is maintained between about 30° C. and about 90° C.

5. A method of preparing α,α'-dibromoxylene comprising: providing a reaction mixture of xylene and a brominating agent selected from the group consisting of bromotrichloromethane, carbon tetrabromide, dibromo-dichloromethane, 1-bromo-1,1-dichloroethane and their mixtures; maintaining the reaction mixture at a temperature between about 0° C. and about 130° C., and exposing the reactants to ultraviolet radiation having a wave length between about 1800 and 4000 Angstrom units until at least a portion of the reactants have formed α,α'-dibromoxylene.

6. A method for the preferential bromination of p-ethyl benzyl chloride in the presence of o-ethyl benzyl chloride comprising: providing a reaction mixture of p-ethyl benzyl chloride, o-ethyl benzyl chloride, and a brominating agent selected from the group consisting of bromotrichloromethane, carbon tetrabromide, dibromodichloromethane, 1-bromo-1,1-dichloroethane and their mixtures; maintaining the reaction mixture at a temperature between about 0° C. and about 130° C., and exposing the reactants to ultraviolet radiation having a wave length between about 1800 and 4000 Angstrom units until at least a portion of the reactants have reacted.

7. A method for the preferential bromination of p-ethyl benzyl bromide in the presence of o-ethyl benzyl bromide comprising: providing a reaction mixture of p-ethyl benzyl bromide, o-ethyl benzyl bromide, and a brominating agent selected from the group consisting of bromotrichloromethane, carbon tetrabromide, dibromodichloromethane, 1-bromo-1,1-dichloroethane and their mixtures; maintaining the reaction mixture at a temperature between about 0° C. and about 130° C., and exposing the reactants to ultraviolet radiation having a wave length between about 1800 and 4000 Angstrom units until at least a portion of the reactants have reacted.

References Cited by the Examiner

Ellis: Chemistry of Petroleum Derivatives, vol. I (1934), pages 769, 770, 779 and 780.

Journal of American Chemical Society, volume 69 (1947), pages 1100–1102.

Lovelace et al.: WADC Technical Report, 55–461 (April 1956), pages 1 and 2.

WINSTON A. DOUGLAS, *Primary Examiner.*

JOHN R. SPECK, JOHN H. MACK, *Examiners.*